… …

United States Patent Office 3,640,920
Patented Feb. 8, 1972

3,640,920
RIGID, LOW-DENSITY, FILLED CELLULAR
POLYURETHANES
Stanley Cear, Wilmington, Del., assignor to Atlas
Chemical Industries, Inc., Wilmington, Del.
No Drawing. Filed May 21, 1969, Ser. No. 826,726
Int. Cl. C08g 22/44, 51/04
U.S. Cl. 260—2.5 AK                9 Claims

ABSTRACT OF THE DISCLOSURE

Rigid, low density polyurethane foam compositions are provided which have excellent freezer stability while retaining the insulative value, compression strength and other desirable physical properties characteristic of rigid polyurethane foams. The polyurethane foams contains from about 0.05% to about 0.5% by weight of a finely divided, solid, particulate, insoluble and non-reactive additive material such as is commonly used in foams as filler material.

---

This invention relates to cellular polyurethane compositions. More particularly, this invention relates to low density polyurethane foam compositions having characteristics of both stability and rigidity and to methods of producing such polyurethane foam compositions. This invention further relates to novel components for preparing polyurethane foam compositions.

Rigid polyurethane foams have found extensive use in modern industrial applications with respect both to the structural and to the insulative capacities thereof. Notwithstanding that the utilization of a low density foam in such applications is generally deemed highly desirable, rigid low density polyurethane foams have in the past frequently exhibited disadvantageous characteristics of marked thermal instability, as evidenced by their tendency to shrink in volume at reduced temperatures or even at ordinary temperatures. Such shrinkage is usually attributable to the collapse, upon condensation to a liquid of the gaseous foaming agent, of relatively attenuated, and consequently weak, cell walls of the foam which result from the high ratio of such foaming agent to polyurethane materials employed in the foam formulation in order to produce a foam of low density. Although particulate fillers of various kinds have been used to reinforce the cell walls of polyurethane foams, their use with low density rigid polyurethane foams has been notably unsuccessful by the reason of the fact that the amounts of such filler deemed necessary from previous experience to strengthen the cell walls of such foam were usually so great as to increase appreciably the density of the foam so treated, thereby defeating the initial advantage of the foam.

It is, accordingly, an object of this invention to provide novel low density polyurethane foam compositions having advantages of thermal stability and rigidity.

It is another object of this invention to provide methods for producing thermally stable, rigid, low density polyurethane foam compositions.

It is another object of this invention to provide a rigid, low density polyurethane foam composition which exhibits excellent "freezer stability" while retaining the insulative value, compression strength and other desirable physical properties characteristic of rigid polyurethane foams.

It is another object of this invention to provide novel components for producing cellular polyurethanes.

The foregoing objects and still further objects of the invention are boardly accomplished in accordance with the method thereof by incorporating into rigid, low density polyurethane foam compositions, within critical proportions by weight, a limited quantity of a finely divided, solid, particulate, insoluble and non-reactive additive material such as is commonly used in foams as filler or extender material.

The particulate additive materials which is used in accordance with this invention to produce stable low density rigid cellular polyurethane compositions may be selected from a wide variety of inert, non-reactive materials including particulate clays, carbons, metals, minerals, polymeric materials and diverse chemical compounds and mixtures thereof. Exemplary of such additive materials are asbestos, activated carbon, diatomaceous earth, barytes, litharge, aluminum flakes and powder, flake graphite, bentonite, montmorillonite, attapulgus clay, calcium silicate, magnesium carbonate, glass flakes and fibers, mica, hydrated calcium silicate, talcum, silica, mineral black, titanium oxide, lead oxide and many others.

The particle size of the particulate, non-reactive material used as an additive to low density polyurethane foam in accordance with this invention varies according to the material used and may range in size from particles as fine as about 0.01 micron in maximum dimension to particles as large as about 250 microns in maximum dimension. The use of particles having a size greater than about 250 microns is not recommended because of the relatively deleterious effect of particles of such size upon the cell walls of the foam composition to which they are added.

The polyurethane compositions falling within the ambit of the present invention are broadly those cellular compositions comprising multiple urethane linkages formed by the reaction of an isocyanate and a compound containing a hydrogen atom or atoms reactive therewith, as, for example, hydroxyl-bearing compounds having terminal hydroxyl groups such as polyesters and polyethers. Polyhydric compounds which may be used to prepare polyurethane foam compositions of the present invention comprise those having a hydroxyl "functionality" of three or more. In general, polyhydric compounds, i.e., polyethers and polyesters, having from three to nine hydroxyl groups in the molecule thereof are used to prepare the polyurethane foams of the present invention. These may be, for example, triols, tetrols, pentitols, hexitols, heptitols, octitols, nonitols and mixtures thereof in any proportion. In accordance with this invention, however, it is a requirement of such polyhydric compounds that they have a hydroxyl number between about 350 and 650 inclusive. Use of polyhydric compounds having a hydroxyl number less than about 350 ordinarily results in foam compositions which are too flexible at the low densities required in the compositions of this invention while use of compounds having a hydroxyl number in excess of about 650 results in foam compositions which are too friable. The term "hydroxyl number" as used throughout this specification denotes the number of milligrams of potassium hydroxide equivalent to the acid required to esterify one gram of the hydroxylic material; the equivalent weight of the hydroxylic material, therefore, is the weight in grams thereof which contains one gram mol of the hydroxyl radical, i.e., 56, 100 divided by hydroxyl number.

Polyether hydroxylic compounds which may be used to prepare polyurethane foam compositions in accordance with this invention comprise polyoxyalkylene ethers of polyhydric alcohols, such as polyoxyalkylene triols, tetrols, pentitols, hexitols and polyethers of still higher functionality. Such polyethers are exemplified by polyoxyalkylene trimethylolethane, polyoxyalkylene trimethylolpropane, polyoxyalkylene hexanetriol, polyoxyalkylene glycerol, polyoxyalkylene butanetriol, polyoxyalkylene erythritol, polyoxyalkylene pentaerythritol, polyoxyalkylene sorbitol, polyoxyalkylene methyl glucoside, polyoxyalkylene sucrose, polyoxyalkylene mannitol, polyoxyalkylene butanetetrol, polyoxyalkylene lactositol and the like. The polyoxyalkylene ether of the polyhydric alcohol may be prepared, if desired, by reacting an alkylene oxide compound with a selected polyhydric alcohol in the conventional manner.

More specifically, among the hydroxyl, bearing compounds which may suitably be used to prepare polyurethane foams in accordance with this invention are polyoxypropylene(10)sorbitol,
polyoxypropylene(4)hexanetriol,
polyoxyethylene(15)sorbitol,
polyoxybutylene(8)glycerol,
polyoxypropylene(5)mannitol,
polyoxypropylene(3)trimethylolethane,
polyoxypropylene(8)trimethylolpropane,
polyoxypropylene(4)sorbitol,
polyoxybutylene(20)lactositol,
polyoxyethylene(6)methyl glucoside,
polyoxypropylene(12)sorbitan,
polyoxypropylene(8)erythritol,
polyoxybutylene(4)pentaerythritol,
polyoxyethylene(3)mannitan,
polyoxyethylene(17)sucrose and many others.

Since the hydroxyl number of the polyol is a function of the number of hydroxyl groups per molecule thereof and the molecular weight of the compounds, it will be evident that the overall range of oxyalkylation in the polyol used in accordance with this invention is limited by the previously defined permissible range in hydroxyl number thereof.

Polyesters suitable for use in the preparation of polyurethane foams of this invention may be obtained by esterification condensation reaction of an aliphatic dibasic carboxylic acid with a triol or an alcohol of higher hydroxylic functionality, or mixtures thereof, in such proportion that the resultant polyesters possess predominately terminal hydroxyl groups.

Polyhydroxylic compounds suitable to the preparation of such polyesters are exemplified by glycerol, 1,2-hexanetriol, trimethylolethane, trimethylolpropane, sorbitol, methyl glucoside, lactositol, mannitol and, in general, any similar polyhydric compound which when reacted in suitable proportion; with a dibasic acid will provide a polyester with a hydroxylic functionality within the range of three to nine.

Aliphatic dicarboxylic acids which may be used to prepare such polyesters comprise adipic acid, fumaric acid, sebacic acid, phthalic acid, maleic acid and many other acids of the kind.

Methods of preparation of polyesters suitable for use in the preparation of polyurethane foams are abundantly described in U.S. Pat. Nos. 2,543,644; 2,593,787; 2,409,633; 2,443,735; 2,443,741; 2,450,552; 2,255,313; 2,512,410; 2,634,251; 2,662,069; and 2,662,070 all hereby incorporated by reference.

A wide variety of organic isocyanate compounds may be used to prepare the novel polyurethane foam compositions of the present invention among which are included toluene diisocyanate, biphenyl diisocyanate, terphenyl diisocyanate, chloro-phenylene- 1,4-diisocyanate, 1,4 - tetramethylene diisocyanate, p-phenylene diisocyanate, polymethylene polyphenyl isocyanate (PAPI), 3,3'-dimethoxy-4,4' - biphenylene diisocyanate, diphenylmethane, 4,4'-diisocyanate and others.

Catalysts which may be used in the preparation of polyurethane foams of the present invention may comprise amine catalysts and tin catalysts or mixtures thereof. Among the suitable amine catalysts are N-alkyl morpholines such as N-methyl morpholine and N-ethyl morpholine; tertiary amines such as trimethyl amine, triethyl amine, tetramethyl guanidine, triethylene diamine, N,N,N',N'-tetramethyl-1,3-butane diamine; piperazine and piperazine derivatives, such as N-methyl piperazine. These amines may be present in amounts from about 0.05% to about 2% by weight of the hydroxyl-bearing compounds reacted with the isocyanate compound. Among the suitable tin catalysts are included dialkyl tin laurates, such as dibutyl tin dilaurate, dibutyl tin bis(2-ethyl hexoate), dibutyl tin diacetate, stannous oleate and stannous octoate. Tin catalysts may be present in amounts from about 0.1% to about 1.0% by weight of the hydroxyl-bearing compounds used in the reaction.

Examples of useful surface active agents which can be present in amounts of from about 0.05% to about 2% by weight of the hydroxyl-bearing components used to prepare the polyurethane foams are water-soluble siloxane-oxyalkylene block copolymers as described in U.S. Pat. No. 2,834,748 to Bailey et al., issued May 13, 1958. Other surfactants which may be used are condensates of ethylene oxide with a hydrophobic base formed by condensing propylene oxide with a propylene glycol. These surfactants have a molecular weight within the range of about 2000 to about 8000 and are generally ascribed the formula

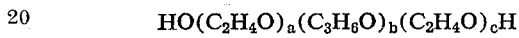
$$HO(C_2H_4O)_a(C_3H_6O)_b(C_2H_4O)_cH$$

Another class of surfactants comprises alkylene oxide adducts of enthylene diamine having generally the formula:

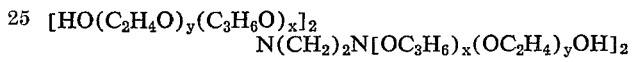
$$[HO(C_2H_4O)_y(C_3H_6O)_x]_2N(CH_2)_2N[OC_3H_6)_x(OC_2H_4)_yOH]_2$$

Still another class of surfactants comprise the polyoxyalkylene esters of long chain fatty acids and sorbitan, such as polyoxyethylene(20)sorbitan monolaurate, polyoxyethylene(4)sorbitan monolaurate, polyoxyethylene-(20)sorbitan tristearate, polyoxyethylene(20)sorbitan monooleate, polyoxyethylene(5)sorbitan monooleate and polyoxyethylene(20)sorbitan trioleate.

Illustrative examples of foaming agents which may be used in the preparation of polyurethane foams of the present invention include water, a halogenated saturated aliphatic hydrocarbon or a mixture of such halogenated saturated aliphatic hydrocarbons; for example, trichlorofluoromethane (Freon 11); monochloroethane; monochloromonofluoroethane; 1,2-dibromo - 1,1,2,2 - tetrafluoroethane; 1,1,2-trifluoroethane; 1,1,2,2-tetrafluoro-1,2-dichloroethane; 1,2-difluoro-1,1,2,2-tetrachloroethane; dichloromethane; dibromomethane and their mixtures. A mixture of a halogenated saturated aliphatic hydrocarbon and water is a preferred foaming agent. In accordance with the method of this invention, not less than about 10% by weight nor more than about 25% by weight based on the total foam formulation of a suitable foaming agent, such as any of those set forth above or other similar foaming agents, is used to prepare the low density foam compositions included within the purview of this invention. Water content of the total foam should not exceed about 0.4% since water liberates carbon dioxide which tends to increase the thermal conductivity of the foam above the limit deemed desirable in foams intended for use as insulation.

Within the context of this specification, the term "low density," when used with reference to the cellular polyurethane compositions of this invention, denotes foams having a density within the range of about 0.75 pound per cubic foot to about 1.7 pounds per cubic foot. Preferably the foams of the present invention have a density lying within a range of about 1.2 pounds per cubic foot to about 1.5 pounds per cubic foot. Polyurethane foams having a density greater than 1.7 pounds per cubic foot are not deemed to be foams of low density within the meaning of that term as used herein.

The polyurethane foams provided in accordance with this invention are rigid foams as distinguished from flexible or semi-rigid foams. Throughout this specification the term "rigid," when used with references to the polyurethane foams of this invention, denotes foams having less than about 20% volume recovery when compressed by about 10% of the volume thereof. Rigid foams of this invention, moreover, comprise foams having not less than about 75% of the cells thereof in the form of closed cells. If more than about 25% of the cells of the said foams were open cells, the insulation values of the foams would be unsatisfactory.

Notwithstanding that the foams of the present invention are rigid, it is characteristic thereof that they exhibit a limited friability as measured by the ASTM Standard Method of Test for "Mechanical Stability of Preformed Thermal Insulation by Tumbling," ASTM Designation C 421–61. When subjected to the cited test, the foams of the present invention show a loss of not more than about 70% by weight of the original sample after ten minutes and preferably not more than about 50%.

The foams of the present invention are intended for use, inter alia, as insulating materials and for that reason it is important that the thermal conductivity thereof, ordinarily expressed as "K factor," should be limited to a value not in excess of about 0.156 as measured initially by the ASTM Standard Method of Test for "Thermal Conductivity of Cellular Plastics by Means of a Probe," ASTM Designation D 2326–64T. Preferably the foams of this invention exhibit an initial thermal conductivity (K factor) within a range of about 0.100 to about 0.130.

The quantity of the particular, non-reactive filler materials introduced into the low density cellular polyurethane compositions of the present invention in accordance with the method thereof is necessarily controlled within limits of severe criticality, for the use of too little of such particulate material will result in foams which do not exhibit the desired strength and thermal stability while too great a quantity thereof will result in foams which are too dense or are otherwise unsatisfactory. For example, it has been observed that as the amount of particulate materials included in experimental low density foams rose above about 0.5% by weight based upon the total foam formulation, the compressive strength of the foams fell considerably. Thermal conductivity of low density foams grows poorer as the amount of particulate material in the foams is increased. At a level of 1% by weight particulate material based upon the total weight of the foam, relatively poor K factor is obtained; at a level of 2% on the same basis, totally unsatisfactory K factors are obtained. Moreover, friability of the foams increases rapidly as the amount of particulate material present in the foams is increased. Finally, at a concentration of about 2% particulate material by weight of the foam, most of the cells of the foam are open cells, resulting as hereinbefore indicated, in relatively poor values for the thermal conductivity of the foams. It will be evident, therefore, that the limits within which particulate materials are added to the low density foams of the present invention are not a matter of choice, but are necessarily imposed by the parameters within which the various properties of the foams must be maintained. Accordingly, in accordance with this invention the cellular polyurethane compositions thereof contain not less than about 0.05% by weight of the total foam composition nor more than about 0.5% by weight thereof. While acceptable foams may be obtained within the broad limits defined above, preferably, for optimum results, the foams of the present invention contain particulate material within a range of about 0.1% by weight to about 0.3% by weight, based on the total weight of the particular foam it is desired to prepare.

The cellular polyurethane compositions of this invention may be prepared in the conventional manner by mixing a polyhydroxylic compound, as hereinbefore described, with a polyisocyanate compound, as hereinbefore specified, in approximately stoichiometric proportion, based upon the hydroxyl number of the polyhydric component. In general, polyurethane foams of the present invention are prepared by reacting a hydroxyl-bearing component with an organic isocyanate in suitable proportion to provide a ratio of isocyanate groups to hydroxyl groups within a range of about 0.9 to about 1.25, with a preferred range for said ratio from about 1.0 to about 1.1. The particulate filler material is usually included in the polyol component but may be included in the isocyanate component, if desired. The amount of filler material included in the polyol is from about 0.125% to about 1.25% based on the weight of polyol. The poylol component and the isocyanate component are mixed vigorously to promote reaction and thereafter the reaction mixture is poured and allowed to foam to completion.

The following examples are illustrative of compositions which are useful as the polyol component for preparing the polyurethane compositions of this invention. These examples are set forth solely for the purposes of illustration and any specific enumeration of details contained therein should not be interpreted as expressing limitations of this invention. It will be readily apparent to those skilled in the art that other compositions may be prepared by substituting other polyols and filler materials for those recited in the following examples. All percentages are by weight:

EXAMPLE 1

| | Percent |
|---|---|
| Polyoxypropylene(10)sorbitol | 99.7 |
| Asbestos (22 microns) | 0.3 |

EXAMPLE 2

| | Percent |
|---|---|
| Polyoxypropylene(15)sorbitol | 98.75 |
| Asbestos (22 microns) | 1.25 |

EXAMPLE 3

| | Percent |
|---|---|
| Polyoxybutylene(8)glycerol | 99 |
| Asbestos (22 microns) | 1 |

EXAMPLE 4

| | Percent |
|---|---|
| Polyoxypropylene(4)hexanetriol | 99.7 |
| Activated carbon (35 microns) | 0.3 |

EXAMPLE 5

| | Percent |
|---|---|
| Polyoxypropylene(5)mannitol | 99.6 |
| Carbon black (250 microns) | 0.4 |

EXAMPLE 6

| | Percent |
|---|---|
| Polyoxypropylene(3)trimethylolethane | 99.5 |
| Diatomaceous earth | 0.5 |

EXAMPLE 7

| | Percent |
|---|---|
| Polyoxypropylene(12)sorbitan | 99.2 |
| Mica | 0.8 |

EXAMPLE 8

| | Percent |
|---|---|
| Polyoxyethylene(17)sucrose | 99 |
| Asbestos (10 microns) | 0.5 |
| Activated carbon (35 microns) | 0.5 |

EXAMPLE 9

| | Percent |
|---|---|
| Polyoxyethylene(6)methyl glucoside | 99.8 |
| Silica | 0.2 |

EXAMPLE 10

| | Percent |
|---|---|
| Polyoxypropylene(10)sorbitol | 60.0 |
| Polyoxypropylene(6)glycerol | 39.7 |
| Asbestos | 0.3 |

The following is a preferred example of the preparation of a low density, thermally stable cellular polyurethane composition as provided in accordance with this invention:

EXAMPLE 11

| | Weight (grams) |
|---|---|
| Component A: Toluene diisocyanate | 59.31 |
| Component B: | |
| Polyoxyethylene(10)sorbitol (hydroxyl No. 490) | 59.75 |
| Organo-silicon surfactant (L5310, Union Carbide) | 0.90 |
| Catalyst (20% triethylene diamine and 80% dimethylethanolamine) (Dabco R–8020, Houdry Process Co.) | 0.90 |
| Water | 0.45 |
| Asbestos (RG–244, Union Carbide. Average particle size—22 microns) | 0.19 |
| Trichlorofluoromethane | 28.50 |
| Asbestos in foam—0.125%. | |

Component B in the above formulation is prepared by adding each of the named ingredients sequentially in the amounts specified while mixing thoroughly with a high speed mixer. To Component B is then added the specified amount of organic isocyanate (Component A) and the resulting mixture is stirred at high speed for 10 seconds with a high speed mixer, after which it is then poured into a one-gallon paper cup. Within about 8 seconds the foam begins to rise and after about 100 seconds the foaming is complete. The fine-celled polyurethane foam produced by this procedure may be found to have the following characteristics:

Physical properties

| | |
|---|---|
| Freezer stability (−20° F.) | Excellent |
| Core density (lbs./cubic feet) | 1.31 |
| 10% compressive strength (p.s.i.) | 13.0 |
| K factor (ASTM D–2326–64T)—Initial | 0.119 |
| K factor (ASTM D–2326–64T)—After freezer | 0.118 |
| Friability loss (ASTM C–421–61): | |
| After two minutes | 5 |
| After ten minutes | 37 |
| Percent closed cells after freezer exposure | 85 |

The foams of the following illustrative examples are prepared according to the procedures of Example 11:

EXAMPLE 12

Formulation

| | Weight (grams) |
|---|---|
| Component A: Toluene diisocyanate | 59.22 |
| Component B: | |
| Polyoxyethylene(10)sorbitol (hydroxyl No. 490) | 59.65 |
| Organo-silicon surfactant (L5310, Union Carbide) | 0.90 |
| Catalyst (20% triethylene diamine and 80% dimethylethanolamine) | 0.90 |
| Water | 0.45 |
| Asbestos (RG–244, Union Carbide) | 0.38 |
| Trichlorofluoromethane | 28.50 |
| Asbestos in foam—0.25%. | |

Physical Properties

| | |
|---|---|
| Freezer stability (−20° F.) | Excellent |
| Core density (lbs. per cubic feet) | 1.29 |
| 10% compressive strength (p.s.i.) | 12.8 |
| K factor: | |
| Initial | 0.118 |
| After freezer | 0.118 |
| Friability loss (ASTM C–421–61): | |
| After two minutes | 4 |
| After ten minutes | 49 |
| Percent closed cells after freezer exposure | 88 |

EXAMPLE 13

Formulation

| | Weight (grams) |
|---|---|
| Component A: Toluene diisocyanate | 50.0 |
| Component B: | |
| Polyoxyethylene(10)sorbitol (hydroxyl No. 490) | 59.50 |
| Organo-silicon surfactant (L5310, Union Carbide) | 0.90 |
| Catalyst (20% triethylenediamine and 80% dimethylethanolamine) | 0.90 |
| Water | 0.45 |
| Asbestos (R. G.—244, Union Carbide) | 0.75 |
| Trichlorofluoromethane | 28.50 |
| Asbestos in foam—0.5%. | |

Physical Properties

| | |
|---|---|
| Freezer stability (−20° F.) | Excellent |
| Core density (lbs./cu. ft.) | 1.32 |
| 10% compressive strength (p.s.i.) | 12.3 |
| K factor: | |
| Initial | 0.123 |
| After freezer | 0.118 |
| Friability loss (ASTM C–421–61): | |
| After two minutes | 9 |
| After ten minutes | 64 |
| Percent closed cells after freezer exposure | 85 |

EXAMPLE 14

Formulation

| | Weight (grams) |
|---|---|
| Component A: Crude toluene diisocyanate (Nacconate 4040, Allied Chemical Co.) | 61.22 |
| Component B: | |
| Polyoxyethylene(3)polyoxypropylene(5)sorbitol | 37.5 |
| Polyoxypropylene(8)sorbitol | 14.4 |
| Polyoxyethylene(1)polyoxypropylene(3) ethylene diamine | 5.8 |
| Organo-silicon surfactant (L5310, Union Carbide) | 0.90 |
| Catalyst (20% triethylenediamine and 80% dimethylethanolamine) | 0.90 |
| Water | 0.45 |
| Asbestos (RG–244, Union Carbide) | 0.38 |
| Trichlorofluoromethane | 28.50 |
| Asbestos in foam—0.25%. | |

Physical Properties

| | |
|---|---|
| Freezer stability (−20° F.) | Excellent |
| Core density (lbs. per cubic feet) | 1.29 |
| 10% compressive strength (p.s.i.) | 12.8 |
| K factor: | |
| Initial | 0.118 |
| After freezer | 0.118 |
| Friability loss (ASTM C–421–61): | |
| After two minutes | 4 |
| After ten minutes | 49 |
| Percent closed cells after freezer exposure | 88 |

EXAMPLE 15

Formulation

| | Weight (grams) |
|---|---|
| Component A: Crude toluene diisocyanate, Nacconate 4040, Allied Chemical Co.) | 63.6 |
| Component B: | |
| Polyoxyethylene(10)sorbitol (hydroxy No. 510) | 55.65 |
| Organo-silicon surfactant (L5310, Union Carbide) | 0.90 |
| Catalyst (20% triethylenediamine and 80% dimethylethanolamine) | 0.90 |
| Water | 0.45 |
| Activated carbon (average particle size—35 microns) | 0.19 |
| Tirchlorfluoromethane | 28.5 |

Physical Properties

Initial (room temperature) K factor _____ 0.109
Freezer exposure K factor _____ 0.114

The following are still further examples of product formulations suitable to the preparation of the cellular polyurethane foams of this invention:

EXAMPLES 16 TO 23

| Example number | 16 | 17 | 18 | 19 | 20 | 21 | 22 | 23 |
|---|---|---|---|---|---|---|---|---|
| Component A (grams): | | | | | | | | |
| Toluene diisocyanate | 61.6 | 61.6 | | | | | | |
| Polymethylene Polyphenylisocyanate (PAPI) | | | 65.6 | 65.6 | 65.6 | | | |
| Diphenylmethane-4,4'-diisocyanate (Mondur MR) | | | | | | 65.6 | 65.6 | 65.6 |
| Component B (grams): | | | | | | | | |
| Polyoxyethylene (10) sorbitol (hydroxyl No. 490) | 57.65 | 57.65 | 53.65 | 53.65 | 53.65 | 53.65 | 53.65 | 53.65 |
| Organo-silicon surfactant (L5310, Union Carbide) | 1.0 | 1.0 | 1.0 | 1.0 | 1.0 | 1.0 | 1.0 | 1.0 |
| Catalyst (20% triethylenediamine and 80% dimethylethanol amine) | 1.0 | 1.0 | 1.0 | 1.0 | 1.0 | 1.0 | 1.0 | 1.0 |
| Water | 0.45 | 0.45 | 0.45 | 0.45 | 0.45 | 0.45 | 0.45 | 0.45 |
| Trichlorofluoromethane | 29.0 | 29.0 | 29.0 | 29.0 | 29.0 | 29.0 | 29.0 | 29.0 |
| Activated carbon (particle size: 35 microns) | 0.2 | | 0.3 | | | 0.4 | | |
| Mica (flakes: 125 microns) | | 0.3 | | 0.25 | | | 0.25 | |
| Asbestos fibers (particle size: 22 microns) | | | | | 0.2 | | | 0.2 |

EXAMPLES 24 AND 25

| Example number | 24 | 25 |
|---|---|---|
| Component A (grams): | | |
| Prepolymer* of T.D.I. and polyoxypropylene (10 sorbitol) | 42.5 | 42.5 |
| Component B (grams): | | |
| Polyoxypropylene (10) sorbitol | 32.5 | 32.4 |
| Organo-silicon surfactant (L5310, Union Carbide) | 0.5 | 0.5 |
| Catalyst [20% triethylenediamine and 80% dimethylethanolamine] | 1.2 | 1.2 |
| Trichlorofluoromethane | 23.0 | 23.0 |
| Asbestos (RG-244, Union Carbide) | 0.2 | |
| Activated carbon (Darco S-51, Atlas Chemical Industries, Inc. one particle size: 35 microns) | | 0.3 |

*Prepolymer prepared by heating 4.5 equivalents of toluene diisocyanate and 1 mol of polyoxypropylene sorbitol together at 80° C. for one hour resulting in a material of about 2000 centipoise viscosity and about 28.5% free —NCO groups.

EXAMPLES 26 TO 34

| Example number | 26 | 27 | 28 | 29 | 30 | 31 | 32 | 33 | 34 |
|---|---|---|---|---|---|---|---|---|---|
| Component A (grams): | | | | | | | | | |
| Polymethylene polyphenylisocyanate (PAPI) | 39.6 | 39.7 | 39.6 | 38.5 | 38.5 | 38.7 | 40.5 | 40.5 | 39.7 |
| Component B (grams): | | | | | | | | | |
| Polyoxypropylene (12) sucrose (hydroxyl No. 430) | 36.7 | 36.8 | 36.7 | | | | | | 36.8 |
| Polyoxypropylene (4) glycerol (hydroxyl No. 405) | | | | 37.9 | 37.9 | 37.9 | | | |
| Polyoxypropylene (6) pentaerythritol (hydroxyl No. 450) | | | | | | | 35.8 | 38.5 | |
| Trichlorofluoromethane | 20.0 | 22.0 | 22.0 | 22.0 | 22.0 | 22.0 | 22.0 | 22.0 | 22.0 |
| Organo-silicon surfactant (L5310, Union Carbide) | 0.5 | 0.5 | 0.5 | 0.5 | 0.5 | 0.5 | 0.5 | 0.5 | 0.5 |
| Catalyst (20% triethylenediamine and 80% dimethylethanolamine) | 1.2 | 1.2 | 1.2 | 1.2 | 1.2 | 1.2 | 1.2 | 1.2 | 1.2 |
| Carbon black (Particle size: 35 microns) | 0.2 | | | 0.3 | | | 0.1 | | |
| Asbestos (RG-244, Union Carbide) | | 0.1 | | | 0.2 | | | 0.3 | |
| Mica flakes (Particle size: 125 microns) | | | 0.3 | | | 0.1 | | | |
| Titanium oxide (Average particle size: 200 microns) | | | | | | | | | 0.2 |

Although this invention has been described with reference to specific materials, including specific isocyanates, polyols and filler materials, it will be apparent that still other different and equivalent materials may be substituted for those described all within the spirit and scope of this invention.

Having described the invention, what is desired to be secured by Letters patent is:

1. A rigid, low density polyether based polyurethane foam composition containing from about 0.05% to about 0.5% by weight, based on total weight of foam composition, of a finely divided, solid, insoluble, non-metallic additive material, non-reactive with the polyurethane forming components and having a particle size of from about 0.01 micron to about 250 microns, said polyurethane foam composition characterized by a density within the range of about 0.75 pounds per cubic foot to about 1.7 pounds per cubic foot, less than about 20% volume recovery when compressed by about 10% of the volume thereof, an initial thermal conductivity value not in excess of about 0.156, and at least about 75% of the cells thereof in the form of closed cells.

2. A rigid, low density polyurethane foam composition of claim 1 wherein the polyurethane is prepared by reacting a polyisocyanate with a polyether hydroxylic compound having at least three hydroxyl groups and having a hydroxyl number from about 350 to about 650 in the presence of a blowing agent.

3. A rigid, low density polyurethane foam composition of claim 2 wherein the additive material is asbestos.

4. A rigid, low density polyurethane foam composition of claim 2 which has a density from about 0.75 to about 1.7 pounds per cubic foot, less than about 20% volume recovery when compressed by about 10% of the volume thereof, at least about 75% of the cells thereof in the form of closed cells, a friability loss of not more than about 70% after ten minutes, and an initial thermal conductivity value not in excess of about 0.156.

5. A rigid, low density polyurethane foam composition of claim 4 which contains from about 0.1% to about 0.3% by weight of the additive material.

6. A rigid, low density polyurethane foam composition of claim 5 wherein the additive material is asbestos.

7. A rigid, low density polyurethane foam composition of claim 4 which has a density from about 1.2 to about 1.5 pounds per cubic foot, a friability loss of not more than 50% after ten minutes and an initial thermal conductivity from about 0.100 to about 0.120.

8. A composition suitable for the preparation of polyurethane foams comprising a mixture of a polyether hydroxylic compound having at least three hydroxyl groups and having a hydroxyl number from about 350 to 650 and from about 0.125% to about 1.25% by weight of polyether hydroxylic compound, of a finely divided, solid, insoluble, non-metallic additive material having a particle size of from about 0.01 micron to about 250 microns, said additive material is selected from the group consisting of asbestos, activated carbon, diatomaceous earth, bentonite, montmorillonite, attapulgus clay, glass flakes, glass fibers, mica, talcum, silica, and mineral black.

9. A composition of claim 8 wherein the polyether hydroxylic compound is a polyoxypropylene ether of sorbitol and the additive material is asbestos.

(References on following page)

References Cited

UNITED STATES PATENTS

| | | | |
|---|---|---|---|
| 2,983,504 | 5/1961 | Reuter et al. | 267—56 |
| 3,015,634 | 1/1962 | Ferrigno | 260—2.5 |
| 3,024,209 | 3/1962 | Ferrigno | 260—2.5 |
| 3,106,537 | 10/1963 | Simon et al. | 260—2.5 |
| 3,150,109 | 9/1964 | Ferrigno | 260—2.5 |
| 3,021,290 | 2/1962 | Gmitter et al. | 260—2.5 |
| 3,227,666 | 1/1966 | Showalter | 260—2.5 |
| 3,441,523 | 4/1969 | Dwyer et al. | 260—2.5 |
| 3,072,582 | 1/1963 | Frost | 260—2.5 |

FOREIGN PATENTS

| | | | |
|---|---|---|---|
| 942,063 | 11/1963 | Great Britain | 260—2.5 |

OTHER REFERENCES

Rigid Urethane Foams—II Chemistry and Formulation, Bulletin of E. I. du pont de Nemours & Co., Bulletin No. HR–26, pp. 11–12 cited (April 1958).

Kirk-Othmer, Encyclopedia of Chemical Technology, 2nd edition vol. 2, pp. 734 and 745 (1964).

DONALD E. CZAJA, Primary Examiner

H. S. COCKERAM, Assistant Examiner

U.S. Cl. X.R.

252—182

PO-1050
(5/69)

UNITED STATES PATENT OFFICE
CERTIFICATE OF CORRECTION

Patent No. 3,640,920　　　　　　Dated February 8, 1972

Inventor(s) Stanley Cear

It is certified that error appears in the above-identified patent and that said Letters Patent are hereby corrected as shown below:

Column 3, line 52, the patent number "2,543,644" should read
-- 2,453,644 --.

Column 3, line 60, "1,4-diisocyanate" should read
-- 2,4-diisocyanate --.

Column 3, line 60, after the (now amended) word "2,4-diisocyanate" and before the word "1,4-tetramethylene" on line 61, add the following words
-- ethylene diisocyanate --.

Column 4, line 41, "1,1,2-trifluoroethane" should read
-- 1,1,2-trichloro-1,2,2-trifluoroethane --.

Columns 9 and 10, the table with the heading "Examples 16 to 23" the second line under the subheading "Component A (grams):", i.e., "Polymethylene Polyphenyl-isacyanate (PAPI)" should read
-- Polymethylene Polyphenylisocyanate (PAPI) --.

Column 9, under the table heading "Examples 24 and 25, the third line under the subheading "Component B (grams):", i.e., "Catalyst 20% triethylenediamine and 80% di-" should read
-- Catalyst [20% triethylenediamine and 80% di- --.

Columns 9 and 10, in the table headed "Examples 26 to 34" and under Example number "33", the second number listed as "38.5" should read -- 35.8 --.

Signed and sealed this 9th day of January 1973.

(SEAL)
Attest:

EDWARD M. FLETCHER, JR.　　　　　　　　ROBERT GOTTSCHALK
Attesting Officer　　　　　　　　　　　　Commissioner of Patent